United States Patent [19]

Kah, Jr.

[11] 4,126,271
[45] Nov. 21, 1978

[54] LASER NOZZLE AND OPTICAL CAVITY WALL CONSTRUCTION

[75] Inventor: Carl L. C. Kah, Jr., North Palm Beach, Fla.

[73] Assignee: United Technologies Corporation, Hartford, Conn.

[21] Appl. No.: 794,168

[22] Filed: May 5, 1977

[51] Int. Cl.² .............................................. B05B 15/00
[52] U.S. Cl. ................................. 239/397.5; 239/568
[58] Field of Search ...................... 239/397.5, 552, 555, 239/568, 557; 331/94.5 D, 94.5 G, 94.5 P

[56] References Cited

U.S. PATENT DOCUMENTS

| | | | |
|---|---|---|---|
| 3,413,704 | 12/1968 | Addoms, Jr. et al. | 239/555 X |
| 3,602,432 | 8/1971 | Mulready | 239/555 X |
| 3,819,321 | 6/1974 | Witt | 239/555 |

Primary Examiner—John J. Love
Attorney, Agent, or Firm—Jack N. McCarthy

[57] ABSTRACT

A laser nozzle and optical cavity wall construction is formed of a plurality of stacked blocks bonded together to prevent inter-nozzle leakage and optical cavity sidewall mismatch in the flow area significant thereto. The blocks are formed having end sections which are bonded together with contoured center sections forming the plurality of nozzles and with integral elongated projections extending downstream to form the optical cavity walls. The blocks have hollow ends which absorb thermal expansion in bending rather than in crushing and tension. The laser device flanges holding the ends of the blocks are also provided with a cantilevered spacing block which maintains a seal load while allowing for expansion, preventing undue stresses resulting from temperature changes.

5 Claims, 1 Drawing Figure

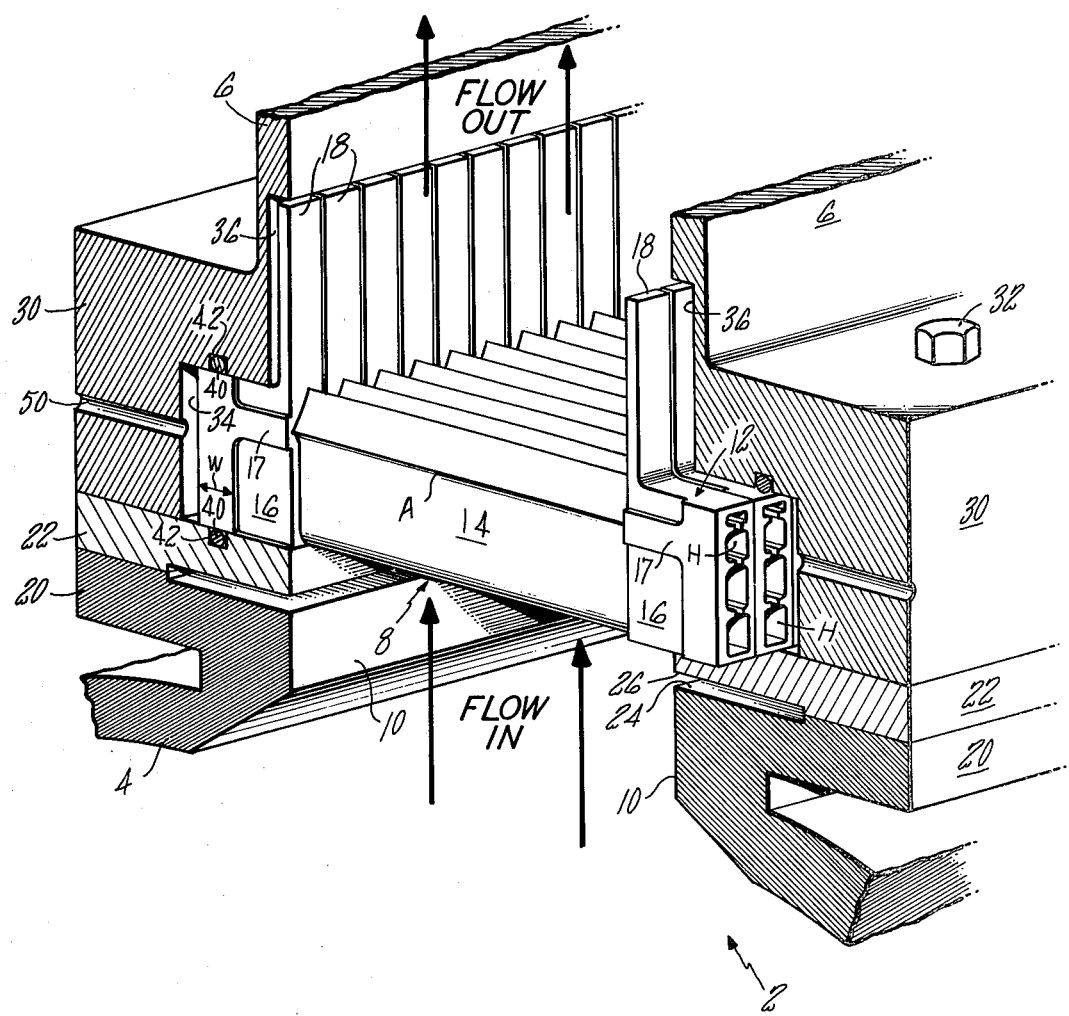

LASER NOZZLE AND OPTICAL CAVITY WALL CONSTRUCTION

BACKGROUND OF THE INVENTION

This invention relates to laser nozzles and optical cavity walls. Two patents which show nozzle assemblies of the wafer type with a nozzle cavity being included in one are U.S. Pat. No. 3,602,432 and U.S. Pat. No. 3,819,321. An entire laser system with flow from a combustor through a plurality of nozzles into a lasing region with reflecting walls is shown in U.S. Pat. No. 3,665,336.

SUMMARY OF THE INVENTION

A primary object of the present invention is to provide a nozzle arrangement of the wafer, or block, type wherein a portion of the optical cavity sidewalls is integrally cast with each wafer, or block, so that when the wafers, or blocks, are placed together, they form a plurality of nozzles along with an integral lasing cavity downstream. The wafers are bonded together to prevent inter-nozzle leakage. Individual wafers or blocks have hollow ends to absorb movement necessitated by temperature changes.

The wafers or blocks are formed having end sections which are mechanically held at a distance from the hot flow surface to keep the temperature at a value which would not cause stress to exceed elastic limits of material used. The blocks, or wafers, are held between adjacent flanges with one flange being mounted as a cantilever to further aid in preventing unwanted stresses during temperature changes while providing a seal load. This arrangement permits the thermal growth of the laser nozzle and optical cavity wall along the stack of blocks to be accommodated by each block in place rather than attempt to slide the blocks and absorb the growth at the ends of the stack of blocks. Absorbing the growth at the ends is a problem because of optical cavity and diffuser end wall match. A laser device has a large number of wafers, or blocks, necessitating large end movements. It is not unusual for a laser device to require in excess of two hundred blocks, or wafers.

BRIEF DESCRIPTION OF THE DRAWINGS

The FIGURE is a perspective view of a nozzle and optical cavity wall means of the wafer type used in laser devices between a source of lasing gas and a diffuser.

DESCRIPTION OF THE PREFERRED EMBODIMENT

With reference to the FIGURE, a laser device 2 comprises a combustion distribution manifold 4 connected to diffuser sidewalls 6 by a laser nozzle and optical cavity wall means 8. The combustion distribution manifold 4 has an elongated outlet 10 for directing the flow of gas for lasing to the laser nozzle and cavity wall means 8.

The laser nozzle and optical cavity wall means 8 comprises a plurality of stacked blocks 12, each of which has (a) a contoured center section 14 which forms a plurality of nozzles with adjacent center sections 14, (b) end portions 16 on the end of each center section for spacing the center sections 14 and sealing adjacent blocks 12, and (c) elongated projections 18 at the end of each center section 14 which extend downstream of the nozzles and form the walls of a laser cavity. The facing sides of end portions 16 each have a slightly raised T-shaped land 17 which mate with each other when the blocks 12 are stacked. The lands extend for a short width $w$ along each free end of end portion 16 and have a portion extending therefrom to the inner surface of the end portion 16 having a width extending upstream and downstream of the throat line A. The raised land is a height which is approximately one-half of the thermal expansion of the material of the block at its hot flow surface. The stacked blocks 12 are bonded together along the surfaces of the T-shaped lands to form the stacked blocks 12 into an integral nozzle and downstream optical cavity wall construction.

The elongated outlet 10 has a flange 20 extending around the opening. A mounting block 22 is placed adjacent the outward face of flange 20. A recessed section 24 is formed along the inner edge of the outer face of flange 20 and a matching recessed section 26 is formed along the mating face of mounting block 22 facing flange 20. These mating recesses form an elongated groove between the flange 20 and mounting block 22 for a purpose to be hereinafter described.

The diffuser sidewalls 6 are connected to the mounting block 22 and flange 20 by a large flange arrangement 30 which also serves to position and support the plurality of stacked blocks 12. The flange 30, mounting block 22 and flange 20 are held together by a plurality of bolts 32. The flange 30 has a recess 34 down each elongated side thereof for receiving the end portions 16 of the stacked blocks 12. A shallower recess 36 extends downstream of recess 34 as a continuation thereof to receive the elongated projections 18 of the stacked blocks 12. This recess 36 is sized to permit thermal growth of the projections 18. In the FIGURE, for clarity, the height of the T-shaped land and the spacing of the projections 18 and recess 36 appears exaggerated.

As can be seen from the FIGURE, the inner surface of the projections 18 and the extending inner surface of the end portion 16 around the contoured center section 14, are positioned as an extension of the inner surface of the adjacent mounting block 22 and the recess 34 is made deep enough to permit the free bonded ends, portion of T-shaped land having the width $w$, of the end portion 16, to be placed far enough from the hot surfaces of the blocks 12 so that the temperature within the laser device does not cause expansion of the contacting parts to cause stresses to exceed the elastic limits of the materials used. It can be seen that the elongated groove formed by the recess section 24 and matching recess section 26 extends outwardly from the flow of lasing gas passage a distance greater than the depth of recess 34. This permits the cantilevered end of mounting block 22 to also permit growth movements due to temperature changes without causing undue stresses.

The end portions 16 of the laser nozzle and optical cavity wall 8 are made hollow at H to a point extending into the contoured center section 14 to aid in absorbing the expansion of stacked blocks 12 in bonded areas which are hot. The hollow portion extends under the portion of the T-shaped land extending from the section of width $w$ to the edge of the block at the hot flow surface.

As seen from the FIGURE, the land extending along the end of each of the end portions 16 cannot have a hollow portion extending underneath its ends, as they are over two of the end walls. The lands at the free end of the end portion 16 are positioned a predetermined distance away of the hot flow surface so that the temperatures are low enough at these locations not to cause thermal stresses to exceed the elastic limit of the materials used. Where the bonded area reaches high temperatures, it is provided with expansion relief by the hollow end which permits bending of the walls carrying the raised land 17. Unbonded areas are relieved for expansion by the slight spacing provided by the lands. However, no low cycle fatigue (LCF) problem exists since these areas are not bonded and do not go into repeated tension and compression.

Positioned within each side surface of recess 34 is a seal groove 40 containing a seal strip 42. These grooves 40 are positioned to engage the sides of the end portions 16 at the center portion of the ends of the lands 17 having the width w. The cantilevered end of mounting block 22 also maintains a positive seal loading force on the seal strips 42 in the grooves 40. This reduces leakage of gases from within the laser device 2. An inner seal vent 50 is provided for the space between the ends of the end portion 16 and the bottom of the recesses 34 to remove any leakage. This vent 50 can be connected to a low pressure to insure outward flow.

I claim:

1. In combination, a laser device comprising an elongated outlet for a flow of lasing gas, a plurality of stacked blocks, means for mounting said blocks across said opening, each of said blocks having (a) a contoured center section for forming a nozzle having a throat with the adjacent block and (b) end portions outwardly of the contoured center section for engagement by said mounting means for mounting the contoured center section of the block across the opening, each end portion of each block having a slightly raised portion for bonding to adjacent blocks, said plurality of stacked blocks being bonded at the raised portion of their end portions to prevent flow leakage across said throat, each end portion being hollow below the bonded area to absorb thermal expansion in bending rather than in compression and tension.

2. A combination as set forth in claim 1 wherein each block has a freely extending integral extension downstream of each end of the contoured center section for movement therewith forming an optical cavity.

3. A combination as set forth in claim 1 wherein the raised portion is T-shaped, one strip extending along the free end of each end portion, a second strip extending from said one strip to the nozzle contoured center section where the nozzle throat will be formed, said one strip being located a predetermined distance from the contoured center section to control the temperature thereof.

4. A combination as set forth in claim 1 wherein said means for mounting said blocks includes a cantilevered mounting flange on one side to provide for movements of material due to thermal changes.

5. A combination as set forth in claim 4 wherein a sealing means extends along the two sides of each of the end portions of said blocks, said cantilevered flange providing a positive seal loading force on said sealing means.

* * * * *